United States Patent
Hill et al.

(10) Patent No.: US 8,605,603 B2
(45) Date of Patent: Dec. 10, 2013

(54) ROUTE CONVERGENCE BASED ON ETHERNET OPERATIONS, ADMINISTRATION, AND MAINTENANCE PROTOCOL

(75) Inventors: Craig T. Hill, Herndon, VA (US); Samer M. Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 12/415,926

(22) Filed: Mar. 31, 2009

(65) Prior Publication Data

US 2010/0246406 A1 Sep. 30, 2010

(51) Int. Cl.
*H04L 12/26* (2006.01)

(52) U.S. Cl.
USPC ........................................ 370/248; 370/241.1

(58) Field of Classification Search
USPC ......... 370/216, 217, 221, 225, 229, 235, 236, 370/236.2, 241, 241.1, 242, 252, 389, 392, 370/400, 401, 248
See application file for complete search history.

(56) References Cited

U.S. PATENT DOCUMENTS

| | | | |
|---|---|---|---|
| 2005/0249124 A1* | 11/2005 | Elie-Dit-Cosaque et al. | 370/242 |
| 2006/0250951 A1* | 11/2006 | Ueda et al. | 370/217 |
| 2009/0075605 A1* | 3/2009 | Yoshida et al. | 455/91 |
| 2009/0154478 A1* | 6/2009 | Sridhar et al. | 370/401 |
| 2009/0232005 A1* | 9/2009 | Mohan et al. | 370/241.1 |
| 2009/0232148 A1* | 9/2009 | Endo et al. | 370/401 |
| 2010/0208593 A1* | 8/2010 | Soon et al. | 370/242 |

* cited by examiner

*Primary Examiner* — Michael Thier
*Assistant Examiner* — Feben M Haile
(74) *Attorney, Agent, or Firm* — Schwegman Lundberg & Woessner, P.A.

(57) ABSTRACT

In an example embodiment, a method of route convergence is provided. In this method, a loss of connectivity is detected along a communication route by way of an Ethernet Operations, Administration, and Maintenance (OAM) protocol. Examples of Ethernet OAM protocols include Connectivity Fault Management protocol and Ethernet Local Management Interface protocol. Thereafter, a data link layer identifier associated with the communication route is identified and this data link layer identifier is mapped to a network layer address. Convergence on an alternate communication route can then be based on the mapped network layer address.

19 Claims, 8 Drawing Sheets

US 8,605,603 B2

ROUTE CONVERGENCE BASED ON ETHERNET OPERATIONS, ADMINISTRATION, AND MAINTENANCE PROTOCOL

FIELD

The present disclosure relates generally to computer networks. In an example embodiment, the disclosure relates to route convergence based on Ethernet operations, administration, and maintenance protocol.

BACKGROUND

In a computer network, route convergence is generally the process of agreement by routers on optimal routes. When a network event causes routes to fail or become available, routers distribute routing update messages that permeate throughout the computer network, which causes the routes to recalculate and agree on optimal routes.

For wide area network connectivity, many enterprise networks use a Layer 2 multipoint Ethernet service from a service provider for inter-site connectivity and deploy customer edge devices for inter-site routing. For route convergence, Border Gateway Protocol (BGP)/Interior Gateway Protocol (IGP) Hello timers may be used to detect connectivity failures between customer edge devices. The problem with this approach is that the use of Hello timers places a heavy processing burden on the customer edge devices. Each customer edge device may also run a Bidirectional Forwarding Detection (BFD) protocol session with every other customer edge device to detect connectivity failures. However, the use of BFD sessions requires excessive message generation, which also places a burden on the customer edge devices and utilizes network bandwidth. Route failures can also be detected by monitoring a line-protocol state on a user-network interface directly connected to the service provider edge device, but it cannot be used to detect connectivity failures that are deeper within the service provider's network.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Overview

A method of triggering route convergence is provided. In this method, a loss of connectivity is detected along a communication route by way of an Ethernet Operations, Administration, and Maintenance (OAM) protocol. Examples of Ethernet OAM protocols include Connectivity Fault Management (CFM) protocol and Ethernet Local Management Interface (E-LMI) protocol. Thereafter, a data link layer identifier associated with the communication route is identified and this data link layer identifier is mapped to a network layer address. Convergence on an alternate communication route can then be based on the mapped network layer address.

Example Embodiments

Figure 1:
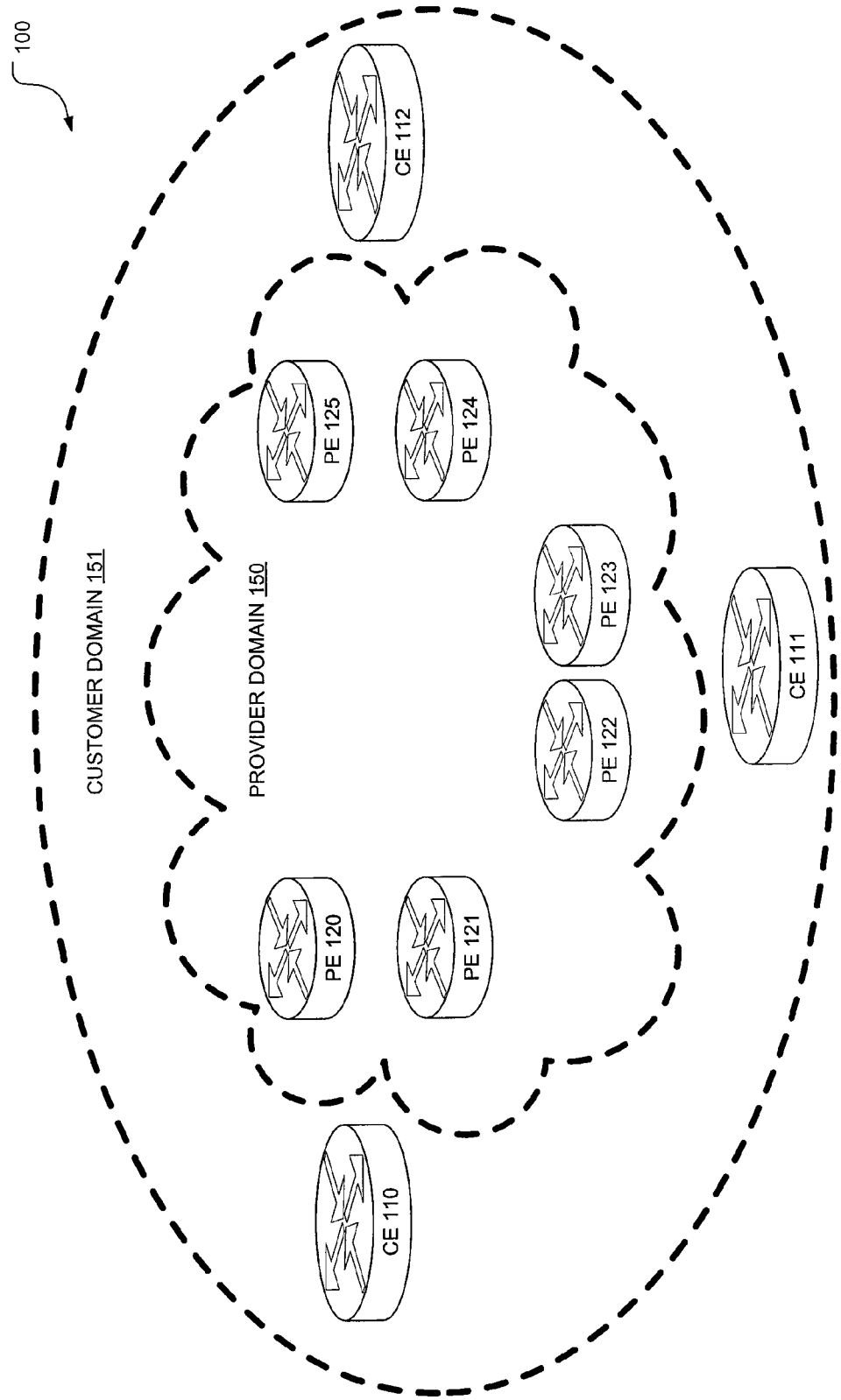
FIG. 1 depicts a diagram of an example of a computer network, in accordance with an embodiment.

FIG. 1 depicts a diagram of an example of a computer network 100, in accordance with an embodiment. This computer network 100 includes a provider maintenance domain 150 and a customer maintenance domain 151 and nested within these domains 150 and 151 are provider edge (PE) devices 120-125 and customer edge (CE) devices 110-112, respectively. The PE and CE devices 120-125 and 110-112 may include a variety of network devices, such as routers, switches, computers, and other network devices. A domain (e.g., the provider maintenance domain 150 or the customer maintenance domain 151) is a collection of nodes under the control of one entity for purpose of network operations and maintenance. It should be noted that a number of nodes (e.g., devices 110-112 and 120-125), and links may be used in the computer network 100, and that the computer network 100 depicted in FIG. 1 shown herein is for simplicity.

A network administrator can assign a unique maintenance level to each domain 150 or 151. It should be noted that levels and domain names are useful for defining the hierarchical relationship that exists among domains 150 and 151. As depicted in FIG. 1, the hierarchical relationship of domains 150 and 151 parallels the structure of a customer and a service provider with the designation of the "customer" domain 151 and the "provider" domain 150, respectively. A PE device (e.g., PE device 120, 121, 122, 123, 124, or 125) is an example of an inter-domain device. The PE device can be placed at the edge of a Layer 2 service provider (SP) network, and may communicate by way of a communication protocol to another PE device or domain. A CE device (CE device 110, 111, or 112) is another example of an inter-domain device. The CE device can be located at the edge of a network associated with a customer or subscriber, and the CE device may communicate by way of a routing protocol to other devices internal or external to its domain. It should be appreciated that CE devices 110-112 and PE devices 120-125 do not participate in routing among each other. The CE devices 110-112 participate in routing among each other, but all the PE devices 120-125 are transparent to the CE devices 110-112 because, for example, the provider is offering a Layer 2 Virtual Private Network service to an enterprise.

In the example of FIG. 1, the devices 110-112 and 120-126 can run and participate in OAM protocols. In general, OAM describes the monitoring of network operations and refers to a set of associated functions that, for example, enables detection of network faults, measurement of network performance, examination of network status, and distribution of fault-related information. The OAM protocol may trigger control plane or management plane mechanisms by, for example, activating rerouting or by raising alarms. Many packet-switched network OAM protocols use packet overhead to piggyback OAM information onto user traffic or introduce special purpose OAM packets alongside user packets.

The CFM protocol (e.g., can also be referred to as Institute of Electrical and Electronics Engineers (IEEE) Standard 802.1ag-2007) is an example of an Ethernet OAM protocol that includes, for example, proactive connectivity monitoring, fault verification, and fault isolation. It should be appreciated that the CFM protocol serves end-to-end, which can be from a PE device to another PE device (e.g., PE device 122 to PE device 125) or from a CE device to another CE device (e.g., CE device 111 to CE device 110). The CFM protocol is also a per-service instance Ethernet OAM protocol, where a service can be identified as a service provider virtual local area network or an Ethernet virtual connection service.

Another example of an Ethernet OAM protocol is the Ethernet Local Management Interface (E-LMI) protocol (e.g., can also be referred to as Metro Ethernet Forum Technical Specification 16—MEF16), which generally provides information that enables automatic configuration of CE devices 110-112 and provides status of Ethernet virtual connections for large Ethernet metropolitan-area networks and wide area networks. For example, E-LMI can notify a CE device 110, 111, or 112 of the operating state of an Ethernet virtual connection and the time when the connection is added or deleted. E-LMI can also communicate the attributes of an Ethernet virtual connection and a user-network interface (UNI) to a CE device 110, 111, or 112.

Figure 2:
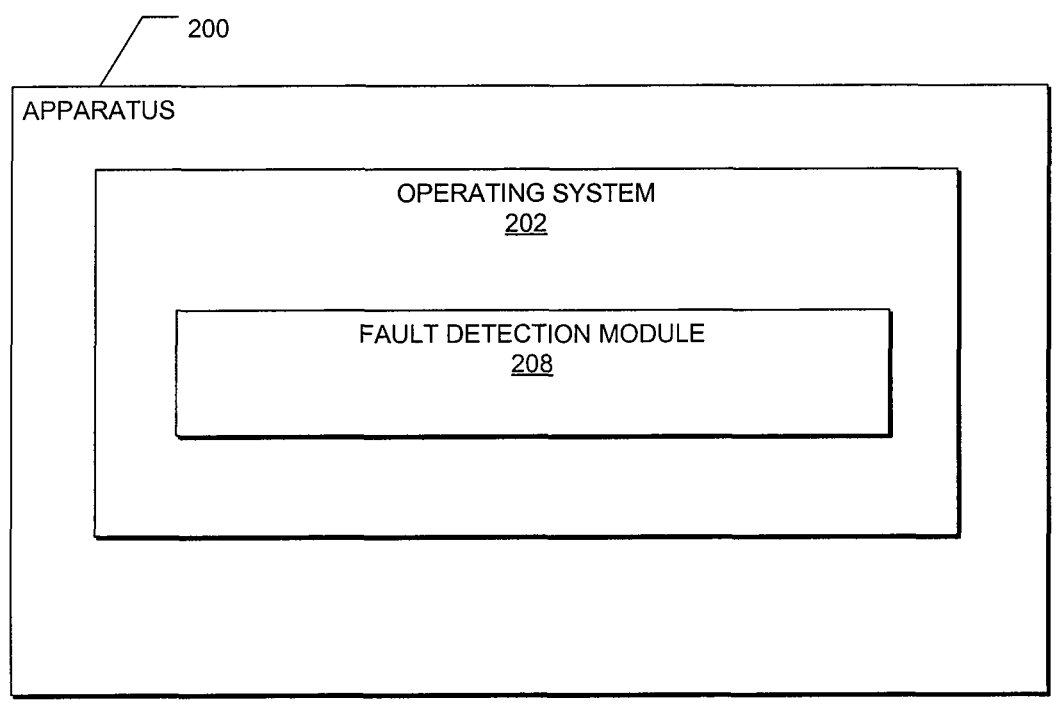
FIG. 2 depicts a block diagram of a fault detection module, in accordance with an embodiment, included in an apparatus.

FIG. 2 depicts a block diagram of a fault detection module 208, in accordance with an embodiment, included in an apparatus 200. It should be appreciated that the apparatus 200 may be deployed in the form of a variety of network devices, such as the CE and PE devices 110-112 and 120-125 depicted in FIG. 1. In various embodiments, the apparatus 200 may be used to implement computer programs, logic, applications, methods, processes, or other software to converge on an alternate communication route, as described in more detail below.

The apparatus 200 includes an operating system 202 (e.g., an Internetworking Operating System) that manages the software processes and/or services executing on the apparatus 200. As depicted in FIG. 2, these software processes and/or services may include a fault detection module 208. As explained in more detail below, the fault detection module 208 is configured to detect loss of connectivity along communication routes by way of the Ethernet OAM protocol. Once a loss of connectivity along a communication route is detected, the fault detection module 208 initiates convergence on an alternate communication route.

It should be appreciated that in other embodiments, the apparatus 200 may include fewer or more modules apart from those shown in FIG. 2. For example, the fault detection module 208 may be separated into multiple modules. The fault detection module 208 may be in the form of software that is processed by a processor. In another example, the fault detection module 208 may be in the form of firmware that is processed by Application Specific Integrated Circuits (ASICs), which may be integrated into a circuit board. Alternatively, the fault detection module 208 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities is implementable by those skilled in the art, having the benefit of the present specification and teachings.

Figure 3:
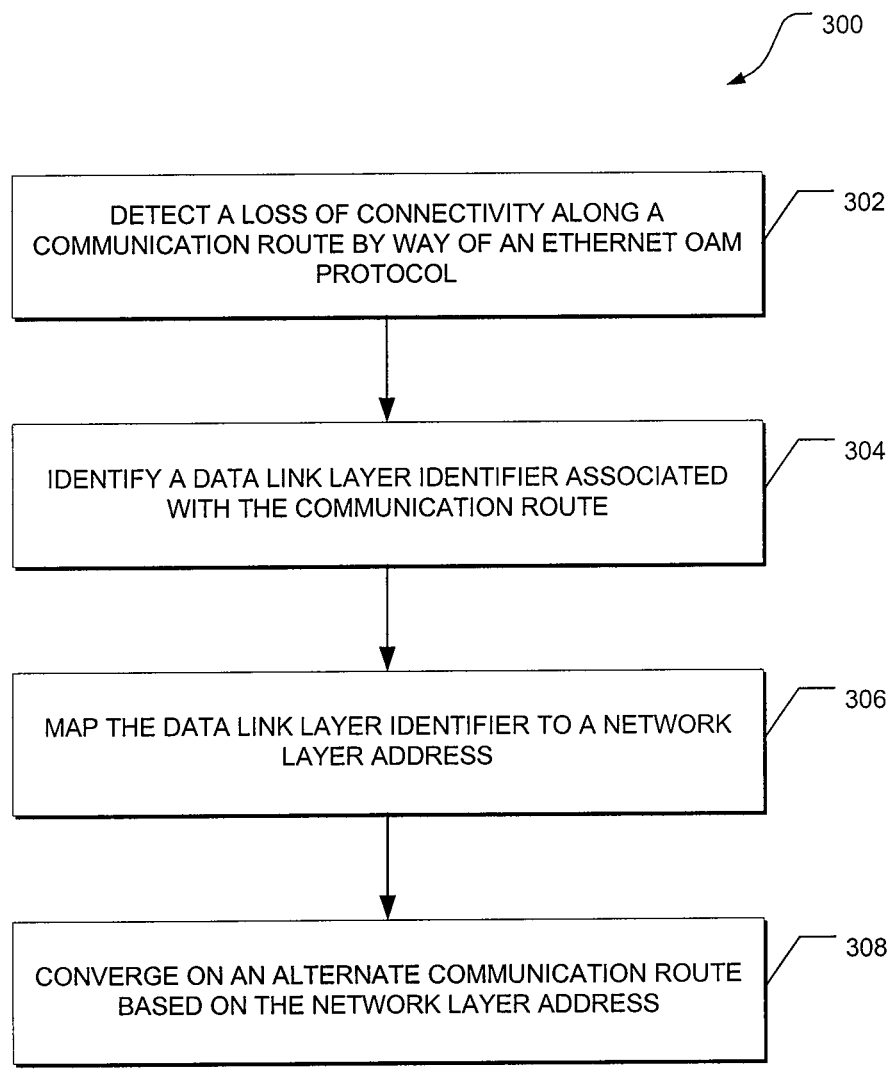
FIG. 3 depicts a flow diagram of a general overview of a method, in accordance with an embodiment, for converging on an alternate communication route.

FIG. 3 depicts a flow diagram of a general overview of a method 300, in accordance with an embodiment, for converging on an alternate communication route. In some embodiments, the method 300 may be implemented by the fault detection module 208 and employed in the apparatus 200 of FIG. 2. As depicted in FIG. 3, a loss of network layer connectivity is detected along one or more communication routes, which is explained below, at 302 by way of an Ethernet OAM protocol. In an embodiment, the loss of connectivity may be detected by detecting a termination of receipt of continuity check messages (CCMs), which is described in more detail below. In an alternate embodiment, the loss of connectivity may be detected by receiving an E-LMI status message indicating that an Ethernet virtual connection is inactive or partially active, which also is described in more detail below.

Upon detection of the loss of connectivity, the data link layer identifier associated with the communication route is identified at 304. It should be appreciated that the data link layer responds to service requests from a network layer (e.g., Layer 3) and issues service requests to a physical layer. For example, the data link layer is the Layer 2 of a seven-layer Open Systems Interconnection (OSI) model. Furthermore, the data link layer is a protocol layer that transfers data between adjacent network nodes in a wide area network or between nodes on the same local area network segment. A data link layer identifier therefore is a unique identifier of a node in the data link layer. A maintenance endpoint identifier, which is explained in more detail below, is an example of a data link layer identifier. A media access control (MAC) address is another example of a data link layer identifier.

The data link layer identifier is then mapped to a network layer address at 306. It should be appreciated that the network layer responds to service requests from a transport layer and issues service requests to the data link layer. In other words, the network layer is responsible for end-to-end (source to destination) packet delivery including routing through intermediate hosts. For example, the network layer is the Layer 3 of a seven-layer Open Systems Interconnection (OSI) model. A network layer address therefore is a unique identifier of a node in the network layer. An example of a network layer address is an Internet Protocol (IP) address.

A variety of different techniques may be used to map the data link layer identifier. In an embodiment, for example, the associations (or correlations) between the data link layer identifier and the network layer address may be stored in a data structure, and the mapping may be based on these associations, which is described in more detail below.

With the network layer address identified, network traffic may then be converged (or diverted) on an alternate communication route based on the identified network layer address at 308. An "alternate communication route," as used herein, refers to an alternate or secondary route used to route network traffic in the event that the primary communication route fails.

Figure 4:
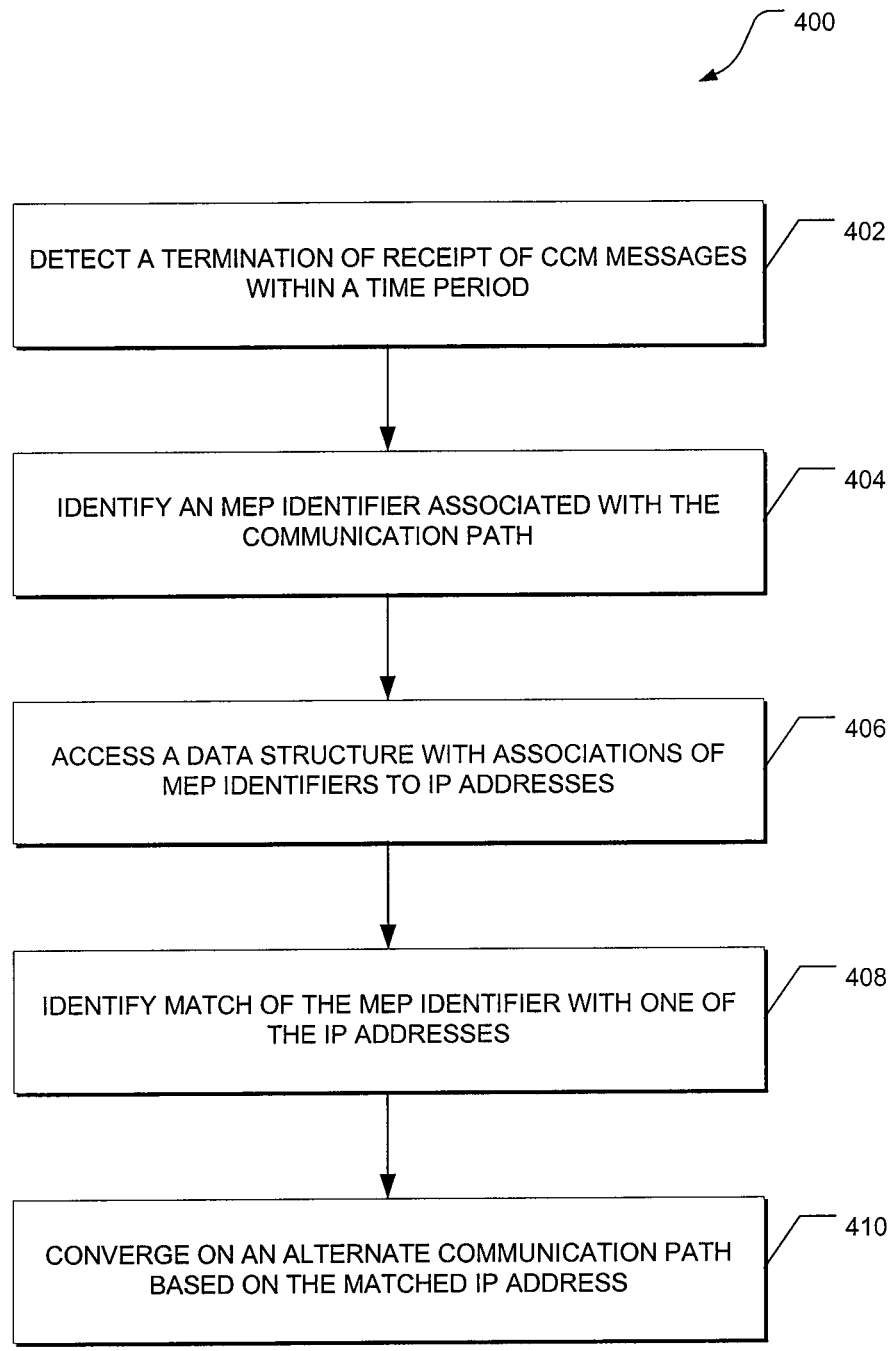
FIG. 4 depicts a flow diagram of a detailed method, in accordance with an embodiment, for converging on an alternate communication route.

FIG. 4 depicts a flow diagram of a detailed method 400, in accordance with an embodiment, for converging on an alternate communication route. In this example, the method 400 may be employed in the CE devices 110-112 of FIG. 2, which are running the CFM protocol as the Ethernet OAM protocol. The CE devices 110-112 are configured with maintenance endpoints and all the maintenance endpoints on the CE devices 110-112 are configured to exchange or transmit continuity check messages at a preset frequency. A "maintenance endpoint (MEP)," as used herein, is a demarcation point on an interface (port) that participates in CFM protocol within a maintenance domain. The maintenance endpoint on a device port acts as a filter that confines CFM frames within the bounds of a domain by dropping frames that do not belong to the correct level. The "continuity check messages," as used herein, refer to multicast heartbeat messages exchanged periodically among maintenance endpoints. As an example, the continuity check messages allow maintenance endpoints to discover other maintenance endpoints within a domain and allow maintenance intermediate points to discover maintenance endpoints.

Returning to FIG. 4, in an embodiment, a loss of connectivity along one or more communication routes can be detected by not having received the continuity check messages from remote maintenance endpoints within a particular time period. That is, as depicted at 402, the loss of connectivity can be detected by detecting a termination of receipt of continuity check messages from other maintenance endpoints on remote CE devices within a particular time period.

Upon detection of the loss of connectivity, the maintenance endpoints trigger an alarm that identifies the loss of connectivity. For example, in an embodiment, a maintenance endpoint can declare a loss of continuity (LOC) alarm when it has not received continuity check messages from a remote maintenance endpoint. This loss of continuity alarm is provided to the routing process to trigger route convergence (or re-convergence) by diverting network layer traffic to an alternate communication route. In an alternate embodiment, if a service has two sites (e.g., point-to-point or an Ethernet virtual private line connection over the provider's network), a maintenance endpoint on a CE device can detect failure based on the receipt of an ITU-T Y.1731 Alarm Indication Signal (AIS) that instructs the maintenance endpoint to enter an AIS alarm state, which triggers route convergence (or re-convergence) and alternate communication route selection.

Additionally, one or more maintenance endpoint identifiers are identified at 404. A "maintenance endpoint identifier," as used herein, refers to a value (numeric and/or textual) that uniquely identifies a maintenance endpoint, and this maintenance endpoint identifier can be inherently identified within the CFM protocol. To map the maintenance endpoint identifier to an IP address, a data structure with associations of maintenance endpoint identifiers to IP addresses is accessed at 406. A "data structure," as used herein, provides context for the organization of data and includes, for example, tables, arrays, linked lists, caches, databases, and other data structures. A data structure may be a lookup table that includes a list of maintenance endpoint identifiers, a list of IP addresses, and associations of each maintenance endpoint identifiers with an IP address. That is, in this lookup table, each maintenance endpoint identifier is associated with an IP address. Alternatively, this data structure can be an Address Resolution Protocol (ARP) cache, which is configured to store a list of media access control (MAC) addresses and IP addresses and associations of each MAC address with an IP address. The mapping of the MAC addresses to the IP addresses is described in more detail below.

Still referring to FIG. 4, a match of the maintenance endpoint identifier to one of the IP addresses is identified from the data structure at 408. In this match, for example, the maintenance endpoint identifier may be compared with the list of maintenance endpoint identifiers in the data structure to identify a match. Once a match of the maintenance endpoint identifier is found, then the IP address that is associated with the matched maintenance endpoint identifier can then be identified from the data structure.

With the loss of connectivity identified, network traffic may then be converged (or diverted) on an alternate communication route based on the identified IP address at 410. The detection of loss of connectivity is independent of the routing protocol, but the operations of converging on an alternate communication route depend on the type of routing protocol used. That is, different types of routing protocols have different types of convergence mechanisms, which may include, for example, withdrawing of communication routes and advertising the changes to neighboring devices.

Figure 5:
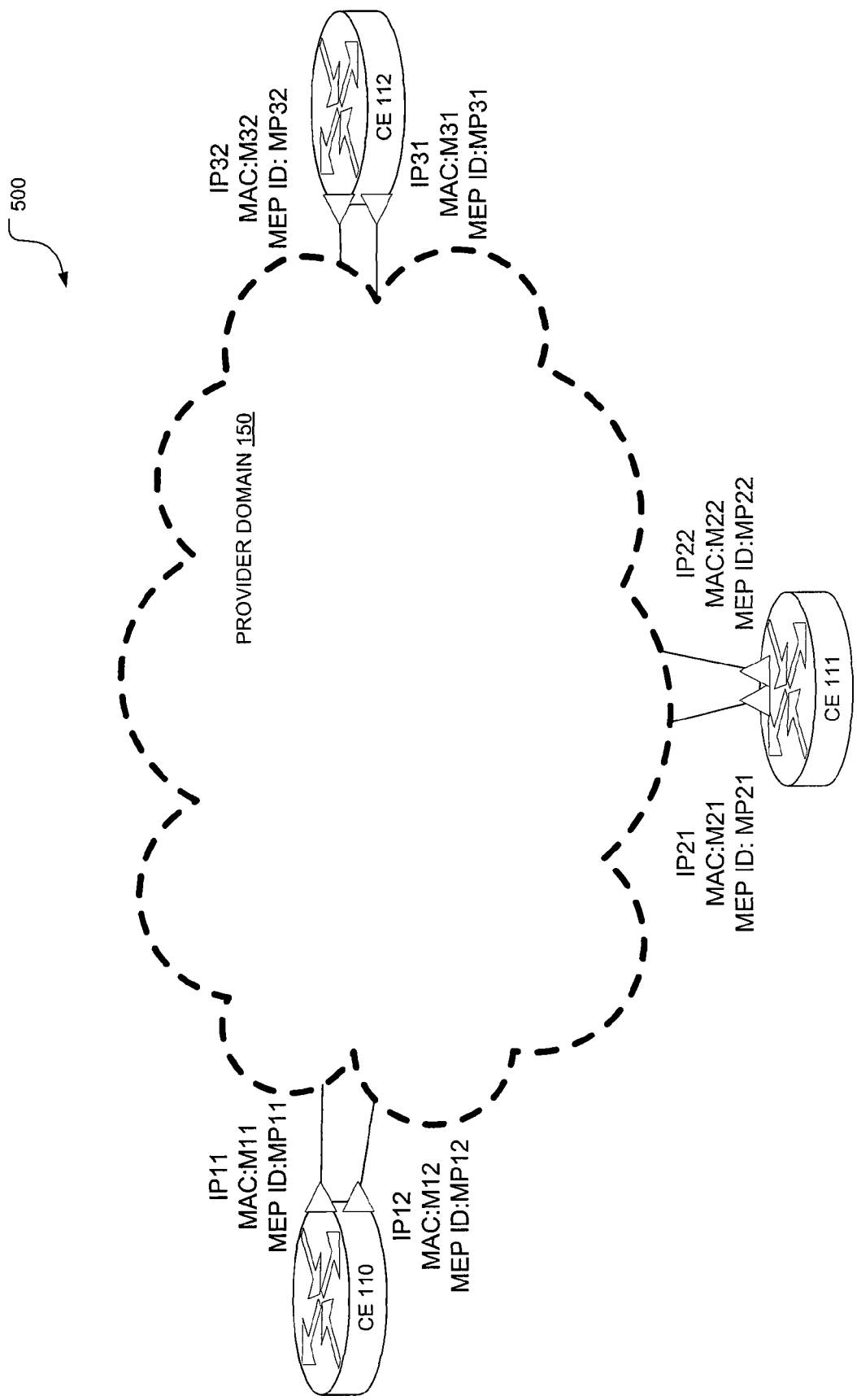
FIG. 5 depicts a diagram illustrating a convergence on an alternate communication route at a computer network with customer edge (CE) devices running the Connectivity Fault Management (CFM) protocol, in accordance with an embodiment.

FIG. 5 depicts a diagram illustrating a convergence on an alternate communication route at a computer network 500 with CE devices 110-112 running the CFM protocol, in accordance with an embodiment. The computer network 500 includes three CE devices 110-112 that are connected over a Metro Ethernet network or a carrier Ethernet network configured with a provider maintenance domain 150. In this embodiment, each CE device 110, 111, or 112 is configured to run the CFM protocol as the Ethernet OAM protocol and is configured with down maintenance endpoints, which are depicted as triangles, on the user network interfaces (UNIs). In particular, each CE device 110, 111, or 112 is configured to have two maintenance endpoints, with each maintenance endpoint on a UNI. Each maintenance endpoint is assigned a maintenance endpoint identifier, the values of which are depicted in FIG. 5. Furthermore, each UNI is assigned or configured with an IP address and has a unique MAC address, the values of which also are depicted in FIG. 5.

The maintenance endpoints on the CE devices 110-112 are configured to exchange or to transmit periodic continuity check messages at a preset frequency. Each maintenance endpoint catalogs or tracks the continuity check messages received from every other maintenance endpoint. When a particular maintenance endpoint detects not having received continuity check messages within a predefined time period, the maintenance endpoint may declare a loss of continuity alarm.

The speed by which a maintenance endpoint can detect a loss of continuity condition can be a function of the continuity check message transmission interval and a configurable loss threshold, which may be expressed as:

$$\text{Fault Detection Time} = CCM \text{ Transmission Interval} * (0.5 + \text{Loss Threshold})$$

The continuity check message transmission interval may range from, for example, approximately 3.3 milliseconds to approximately 10 seconds, which leads to a fault detection time of approximately 11.6 milliseconds and approximately 35 seconds, respectively.

When an Ethernet interface comes online and establishes a CFM maintenance endpoint (and the line protocol is "up" on the CE device 110, 111, or 112), each maintenance endpoint is configured to advertise or multicast its maintenance endpoint identifier to MAC address association to all CE nodes within the maintenance association (MA), which allows all the maintenance endpoint identifier to MAC address associations to be populated in each CE device 110, 111, or 112. Each receiving CE device 110, 111, or 112 then populates a particular data structure with the MAC address and maintenance endpoint identifier pairs of all maintenance endpoints. As an example, the maintenance endpoint on CE device 111 with maintenance endpoint identifier MP21 advertises its MAC address M21 to the corresponding maintenance endpoints on the CE devices 110 and 112, which store the maintenance endpoint identifier MP21/MAC address M21 pair in their caches (or data structures).

As soon as a loss of connectivity is detected, the affected maintenance endpoint identifier(s) of the destination with the loss of connectivity can be identified by way of CFM protocol, and by examining the data structure and an Address Resolution Protocol cache, the corresponding IP address and IP routing adjacency can be derived. For example, when CFM protocol triggers a loss of connectivity alarm signal indicating a failure associated with a maintenance endpoint identifier, the data structure that stores the MAC address/maintenance endpoint identifier pairs is accessed to identify the MAC address associated with the failed maintenance endpoint identifier.

With the MAC address identified, the Address Resolution Protocol cache that stores the MAC address to IP address associations is queried to identify and determine which IP routing adjacency to withdraw from the routers Routing Information Protocol Base (RIB). The routing protocol is then instantly triggered to initiate a routing convergence process, which immediately diverts network traffic to an alternate communication route. As discussed above, the IP routing convergence process is specific to the IP routing protocol enabled on the CE device. In the example of FIG. 5, if there is a loss of connectivity at a maintenance endpoint with maintenance endpoint identifier MP11, then the CE device 110 may signal a route convergence process to CE devices 111 and 112, to immediately withdraw the IP subnets corresponding to IP address IP11 on CE device 110, and reroute or converge all network traffic to the alternate communication route associated with IP address IP12. It should be appreciated that the reaction to the loss of connectivity alarm is almost instantaneous within each CE device 110, 111, or 112 and thereby quickly triggering the routing protocol convergence process, which results in fast convergence.

Instead of creating a new data structure that stores the maintenance endpoint identifier and network address associations, the CFM Maintenance Endpoint Continuity Check Database and the Address Resolution Protocol cache, which are present in network devices that support CFM and routing, may be accessed to map the maintenance endpoint identifier to the network layer address, in accordance with another embodiment of the invention. Here, the Address Resolution Protocol cache may store IP addresses, MAC addresses, and their associations with each other. As soon as a loss of connectivity is detected, the affected maintenance endpoint identifier is identified by CFM. From CFM, the MAC address associated with the maintenance endpoint identifier can be identified by another mapping of the maintenance endpoint identifier to the MAC address, which may be kept in the CFM Maintenance Endpoint Continuity Check Database. The IP address associated with the identified MAC address can then be identified from the Address Resolution Protocol cache with a lookup of the MAC address.

In yet another embodiment, another data structure can also be created from a combination of the Address Resolution Protocol cache with a table of maintenance endpoint identifier to MAC address associations. This combination creates a data structure with IP addresses, maintenance endpoint identifiers, MAC addresses, and their associations with each other. In this embodiment, the routing process can map a maintenance endpoint identifier to its IP address by accessing this data structure with the IP address-to-maintenance endpoint identifier-to-MAC address associations to identify quickly which neighbor adjacency to withdraw when an event occurs to cause a routing convergence process to be triggered.

Figure 6:
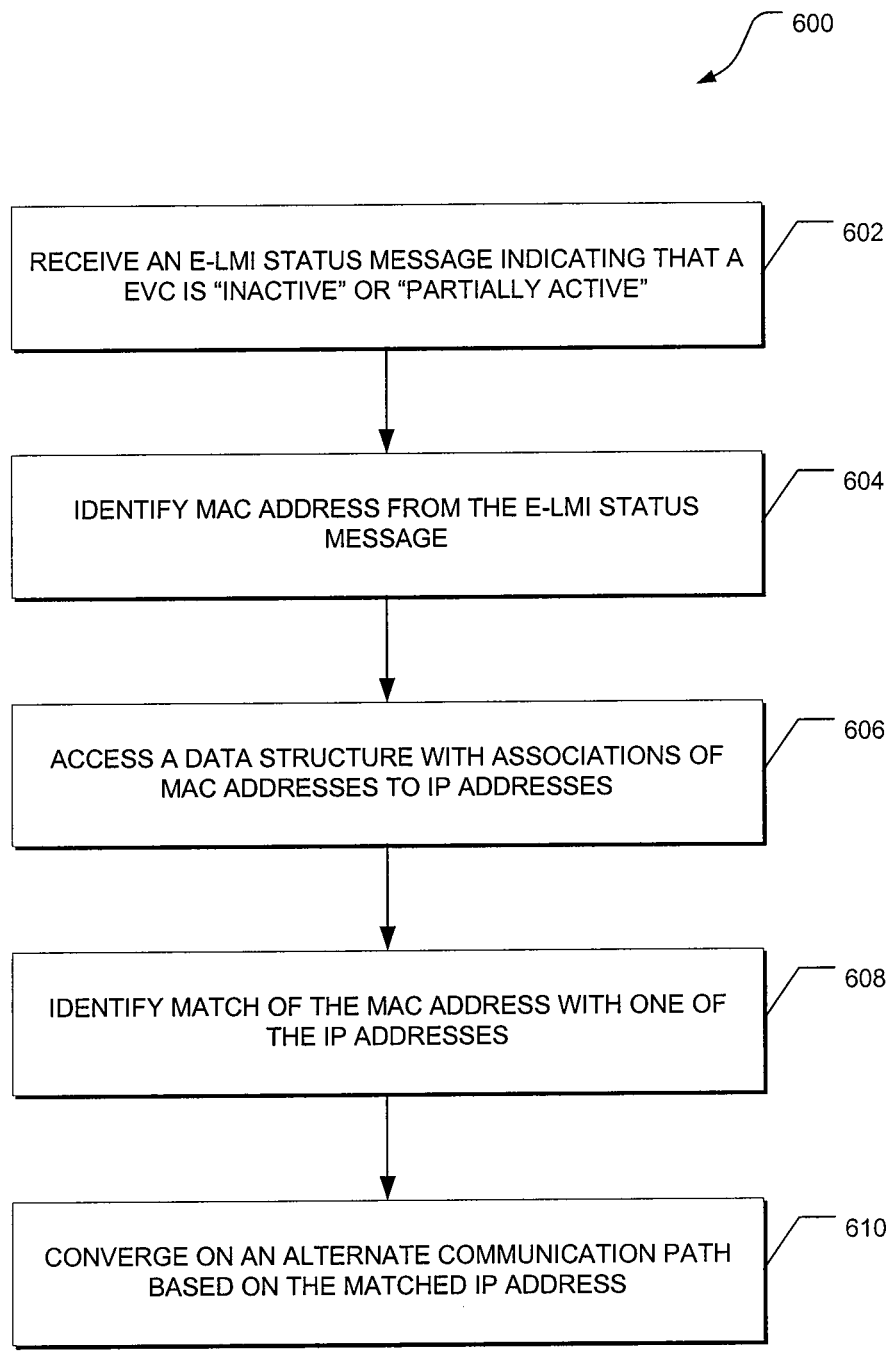
FIG. 6 depicts a flow diagram of a detailed method, in accordance with another embodiment, for converging on an alternate communication route.

FIG. 6 depicts a flow diagram of a detailed method 600, in accordance with another embodiment, for converging on an alternate communication route. In this example, the method 600 may be employed in the CE devices 110-112 of FIG. 2, which are running the E-LMI protocol as the Ethernet OAM protocol. The CFM protocol is instead employed in the PE devices 120-125. As a result, the CE devices 110-112 communicate with the PE devices 120-125 by way of E-LMI protocol while the PE devices 120-125 communicate with each other by way of CFM protocol.

As depicted in FIG. 6, the loss of connectivity along one or more communication routes can be detected by receiving an E-LMI status message at 602 indicating that an Ethernet virtual connection (EVC) is either inactive or partially active. For example, a CE device is notified of a loss of connectivity by way of an E-LMI status message with a report type set to "Single Ethernet Virtual Connection Asynchronous Status." If the E-LMI status message indicates that the Ethernet virtual connection is "inactive" or "not active," then the CE device triggers routing convergence to an alternate communication route for all destinations that are reachable by way of that interface (or sub-interface). On the other hand, if the E-LMI status message indicates that the Ethernet virtual connection is "partially active," then the CE device transmits an E-LMI status inquiry message with report type set to "full status" in order to recover from the PE devices more context of the affected remote sites (e.g., remote CE devices that are affected by the loss of connectivity). The PE devices may respond to the request with a status message that includes a set of one or more remote user-network interface status (along with a remote user-network interface identifier). As explained in more detail below, the CE device associates the remote user-network interface identifier with the explicit neighbor IP address for use in triggering a routing convergence.

As soon as a loss of connectivity is detected, the MAC address included in the E-LMI status message or other E-LMI messages is identified at 604. As explained in more detail below, a PE device may include or embed the MAC address into an E-LMI message and transmit it to the CE device. In turn, the CE device can examine the E-LMI status message for an embedded MAC address.

With the MAC address identified, a data structure, such as the Address Resolution Protocol cache, is accessed at 606 that includes MAC addresses, IP addresses, and associations of the MAC addresses with the IP addresses. A match of the MAC address to one of the IP addresses is identified from the data structure at 608. For example, the MAC address identified from the E-LMI status message may be compared with a list of MAC addresses in the Address Resolution Protocol cache to identify a match. Once a match of the MAC address is found, then the IP address (associated with the routing protocol neighbor) that is associated with the matched MAC address can then be identified from the Address Resolution Protocol cache. With the loss of connectivity identified, network convergence of the routing protocol will be triggered, diverting network traffic on an alternate communication route based on the identified IP address at 610.

Figure 7:
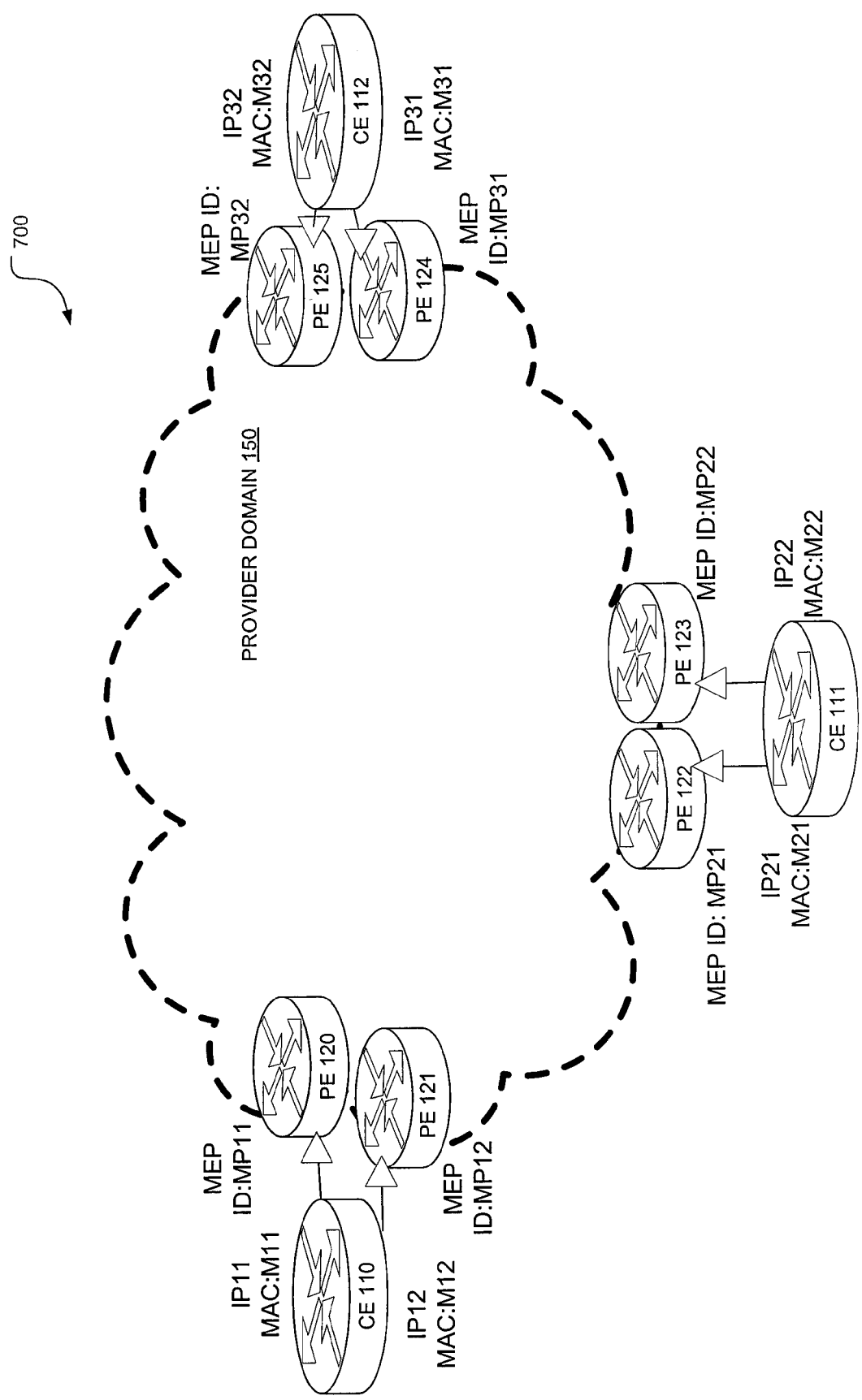
FIG. 7 depicts a diagram illustrating a convergence on an alternate communication route at a computer network with CE devices running the Ethernet Local Management Interface (E-LMI) protocol, in accordance with an alternate embodiment.

FIG. 7 depicts a diagram illustrating a convergence on an alternate communication route in a computer network 700 with CE devices 110-112 running the E-LMI protocol, in accordance with an alternate embodiment. The computer network 700 includes three CE devices 110-112 that are in communication with PE devices 120-125 over a Metro Ethernet network or a carrier Ethernet network, configured with a provider maintenance domain 150. The PE devices 120-125 are configured to run the CFM protocol while the CE devices 110-112 are configured to run the E-LMI protocol. As a result, the PE devices 120-125 communicate with each other by way of CFM protocol and the CE devices 110-112 communicate with the PE devices 120-125 by way of E-LMI protocol. Each PE device 120, 121, 122, 123, 124, or 125 is configured with "Up" maintenance endpoints, which are depicted as triangles, and each maintenance endpoint is assigned a maintenance endpoint identifier, the values of which are depicted in FIG. 7. The UNIs of each CE device 110, 111, or 112 is assigned or configured with an IP address and a MAC address, the values of which are also depicted in FIG. 7.

In this embodiment, the PE devices 120-125 can identify the MAC addresses of connected CE devices 110- 112 by snooping the source MAC addresses of the E-LMI messages generated by the CE devices 110-112. Given that each port (or UNI) connects to a single CE device 110, 111, or 112, the PE devices 120-125 can build a MAC-address-to-UNI association for each directly connected CE device 110, 111, or 112. Each of the PE devices 120-125 then embeds or includes the identified MAC address within, for example, an organization-specific type-length-value (TLV) carried in the continuity check message frames. As a result, the MAC address to UNI associations can be communicated between PE devices 120-125 to allow each PE device (e.g., PE device 123) to build a MAC address to UNI association for all CE devices 110-112 within a given service. The PE devices 120-125 then transmit the MAC address to UNI associations to the CE devices 110-112 by way of the E-LMI protocol. As such, an E-LMI remote UNI information element can be defined to incorporate the MAC addresses of the remote CE devices 110-112. The CE devices 110-112 can then build a mapping of the IP addresses to remote UNIs by using, for example, the Address Resolution Protocol cache in combination with the MAC address to UNI associations.

As an example, the PE device 120 can identify the MAC addresses of connected CE device 110 by tracking the source MAC address of the E-LMI messages generated by the CE device 110. The PE device 120 then embeds or includes the identified MAC address in continuity check messages and advertises the continuity check messages to all the other remote maintenance endpoints in the same maintenance association. The PE device 125, for example, receives the continuity check messages, identifies the MAC address from the continuity check messages, embeds the MAC address in a remote UNI information element of an E-LMI status message, and then transmits the E-LMI status message to the CE device 112. Upon receipt of the E-LMI status message, the CE device 112 identifies the MAC address from the E-LMI status message and then maps or associates the MAC address to its IP address using, for example, the Address Resolution Protocol cache, as described above.

In an alternate embodiment, the IP addresses of the CE devices 110-112 may be directly embedded or included in the remote UNI information element. Here, the MEPs on the PE devices 120-125 are exposed to the IP addresses of the CE devices 110-112 through, for example, explicit configuration. As a result, each CE device 110, 111, or 112 can directly identify the IP addresses of remote CE devices 110, 111, or 112 from the E-LMI messages. In this example, the CE devices 110-112 may include logic to decode and translate a textual representation of the IP address, in the form of a UNI identifier, to a numeric representation, and then build a data structure of IP address to UNI associations. When the E-LMI protocol reports a partially active Ethernet virtual connection to a CE device 110, 111, or 112, this CE device 110, 111, or 112 receives a listing of the affected remote UNIs, which is a list comprising the textual representation of the neighboring IP addresses. This CE device 110, 111, or 112 can then trigger convergence to alternate communication paths for the affected IP route destinations.

Figure 8:
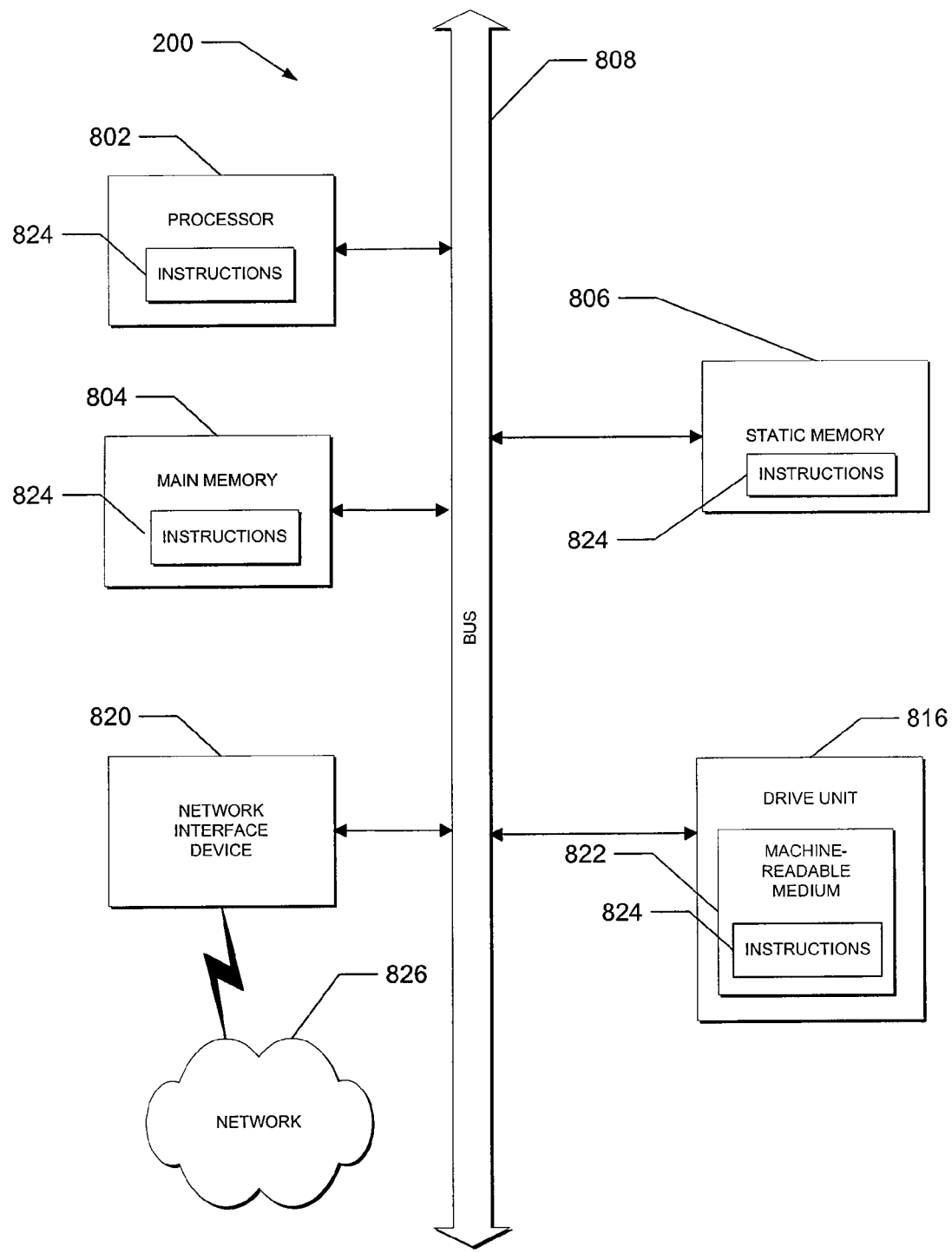
FIG. 8 is a simplified block diagram of a machine in the example form of an apparatus within which a set of instructions, for causing the machine to perform any one or more of the methodologies discussed herein, may be executed.

FIG. 8 is a simplified block diagram of a machine in the example form of an apparatus 200 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 200 includes a processor 802 (e.g., a central processing unit (CPU)), a main memory 804, and a static memory 806, which communicate with each other via bus 808. The apparatus 200 may also include a disk drive unit 816 and a network interface device 820.

The disk drive unit 816 includes machine-readable medium 822 on which is stored one or more sets of instructions and data structures 824 (e.g., software) embodying or utilized by any one or more of the methodologies or functions described herein. The instructions may also reside, completely or at least partially, within the main memory 804 and/or within the processor 802 during execution thereof by the apparatus 200, with the main memory 804 and the processor 802 also constituting machine-readable, tangible media. The instructions 824 may further be transmitted or received over network 826 via network interface device 820 utilizing any one of a number of well-known transfer protocols.

While machine-readable medium 822 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for route convergence may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
performing a number of operations by a routing device, the operations including:
monitoring a communication route using an Ethernet Operations, Administration, and Maintenance (OAM) protocol;
detecting a loss of connectivity along the communication route by way of the OAM protocol; and
in response to the detected loss of connectivity along the communication route:
identifying a Media Access Control (MAC) address associated with the communication route by:
identifying a maintenance endpoint (MEP) identifier associated with the communication route; and
mapping the MEP identifier to the MAC address, mapping the MAC address to an Internet Protocol (IP) address, and
converging on an alternate communication route based on the IP address.

2. The method of claim 1, wherein the detection of the loss of connectivity comprises detecting a termination of receipt of a continuity check message within a time period.

3. The method of claim 1, wherein the mapping of the MAC address comprises:
accessing a data structure that is configured to store a plurality of MAC addresses s, a plurality of IP addresses, and a plurality of associations between each of the plurality of MAC addresses s and each of the plurality of IP addresses;
identifying a match of the MAC address with one of the plurality of MAC addresses s; and
identifying one of the plurality of IP addresses that is associated with the one of the plurality of MAC addresses based on one of the plurality of associations between the one of the plurality of MAC addresses and the one of the plurality of IP addresses.

4. The method of claim 3, wherein the identification of the match of the MAC address comprises comparing the MAC address with at least one of the plurality of MAC addresses.

5. The method of claim 3, wherein the data structure comprises an Address Resolution Protocol (ARP) cache.

6. The method of claim 3, wherein the data structure comprises a Maintenance Endpoint Continuity Check Database.

7. The method of claim 1, wherein the Ethernet OAM protocol is a Connectivity Fault Management (CFM) protocol.

8. Logic encoded in one or more non-transitory tangible media for execution by a routing device, and when executed operable to cause the routing device to:
monitor a communication route using an Ethernet Operations, Administration, and Maintenance (OAM) protocol;
detect a loss of connectivity along a communication route by way of the OAM protocol; and
in response to the detected loss of connectivity along the communication route:
identify a data link layer identifier associated with the communication route by:
identifying a maintenance endpoint (MEP) identifier associated with the communication route; and
mapping the MEP identifier to the data link layer identifier;
map the data link layer identifier to a network layer address; and
converge on an alternate communication route based on the network layer address.

9. The logic of claim 8, wherein the operation of detecting the loss of connectivity, when executed, being further operable to receive an Ethernet Local Management Interface (E-LMI) STATUS Message indicating that an Ethernet virtual connection is inactive or partially active.

10. The logic of claim 8, wherein the data link layer identifier is a Media Access Control (MAC) address of a remote network device with which connectivity had been lost, and wherein the operation of identifying the data link layer identifier, when executed, being further operable to:
receive an Ethernet Local Management Interface (E-LMI) message, the E-LMI message including the MAC address; and
identify the MAC address from the E-LMI message.

11. The logic of claim 8, wherein the Ethernet OAM protocol is an Ethernet Local Management Interface (E-LMI) protocol.

12. A routing device comprising:
at least one processor; and
a machine-readable medium in communication with the at least one processor, the machine-readable medium being configured to store a fault detection module, the fault detection module being executed by the at least one processor cause operations to be perforated, comprising:
monitor a communication route using an Ethernet Operations, Administration, and Maintenance (OAM) protocol;
detecting a loss of connectivity along a communication route by way of the OAM protocol; and
in response to the detected loss of connectivity along the communication route:
identifying a data link layer identifier associated with the communication route by:
identifying a maintenance endpoint (MEP) identifier associated with the communication route; and
mapping the MEP identifier to the data link layer identifier;
mapping the data link layer identifier to a network layer address and
converging on an alternate communication route based on the network layer address.

13. The routing device of claim 12, wherein the operations further comprise transmitting a continuity check message at a preset frequency.

14. The routing device of claim 12, wherein the operation of detecting the loss of connectivity comprises:
detecting not having received a continuity check message from another network device within a time period; and triggering an alarm signal identifying the loss of connectivity.

15. The routing device of claim 12, wherein the operation of mapping the data link layer identifier comprises:
   accessing a data structure that is configured to store a plurality of data link layer identifiers, a plurality of network layer addresses, and a plurality of associations between each of the plurality of data link layer identifiers and each of the plurality of network layer addresses;
   comparing the data link layer identifier with at least one of the plurality of data link layer identifiers to identify match of the data link layer identifier with one of the plurality of data link layer identifiers; and
   identifying one of the plurality of network layer addresses that is associated with the one of the plurality of data link layer identifier based on one of the plurality of associations between the one of the plurality of data link layer identifier and the one of the plurality of network layer addresses.

16. The routing device of claim 12, wherein the data link layer identifier is a maintenance endpoint (MEP) identifier.

17. The routing device of claim 12, wherein the data link layer identifier is a Media Access Control (MAC) address.

18. The routing device of claim 12, wherein the network layer address is an Internet Protocol (IP) address.

19. The routing device of claim 12, wherein the communication route is along a network layer.

* * * * *

UNITED STATES PATENT AND TRADEMARK OFFICE
CERTIFICATE OF CORRECTION

PATENT NO.        : 8,605,603 B2                                      Page 1 of 1
APPLICATION NO.   : 12/415926
DATED             : December 10, 2013
INVENTOR(S)       : Hill et al.

It is certified that error appears in the above-identified patent and that said Letters Patent is hereby corrected as shown below:

In the Claims:

In column 11, line 44, in Claim 3, delete "addresses s" and insert --addresses--, therefor In column 11, line 46, in Claim 3, delete "addresses s" and insert --addresses--, therefor In column 11, line 49, in Claim 3, delete "addresses s" and insert --addresses--, therefor In column 12, line 42, in Claim 12, after "comprising:", insert --¶--, therefor In column 13, line 12, in Claim 15, delete "match" and insert --a match--, therefor Signed and Sealed this
Nineteenth Day of August, 2014

Michelle K. Lee
*Deputy Director of the United States Patent and Trademark Office*